United States Patent [19]

Faigle et al.

[11] Patent Number: 5,016,914
[45] Date of Patent: May 21, 1991

[54] VEHICLE OCCUPANT RESTRAINT SYSTEM

[75] Inventors: Ernst M. Faigle, Imlay City; John H. Semchena, Royal Oak; Richard J. Thompson, Imlay City, all of Mich.

[73] Assignee: TRW Vehicle Safety Systems Inc., Lyndhurst, Ohio

[21] Appl. No.: 480,075

[22] Filed: Feb. 14, 1990

[51] Int. Cl.[5] .............................................. B60R 21/08
[52] U.S. Cl. .................................. 280/741; 280/742; 102/202.5
[58] Field of Search ............... 280/741, 727, 728, 734, 280/736, 740, 742; 149/19.91, 35; 102/202.5, 335, 531

[56] References Cited

U.S. PATENT DOCUMENTS

| | | | |
|---|---|---|---|
| 3,741,585 | 6/1973 | Hendrickson et al. | 280/741 |
| 3,818,764 | 6/1974 | Wagner | 280/741 |
| 3,877,882 | 4/1975 | Lette et al. | 280/741 |
| 4,109,578 | 8/1978 | Goetz | 280/741 |

Primary Examiner—Richard A. Bertsch
Attorney, Agent, or Firm—Tarolli, Sundheim & Covell

[57] ABSTRACT

A source of gas for inflating a vehicle occupant restraint comprises a container. Gas generating material in said container comprises an alkali metal azide and a metal oxidizer. When ignited, the gas generating material produces heated nitrogen gas. A supply of pressurized nitrogen gas is also in the container. Structure is provided for separating the supply of pressurized nitrogen gas from the gas generating material. The separating structure is releasable to enable the heated nitrogen gas and the stored nitrogen gas to commingle. The source of gas also includes structure for directing the stored nitrogen gas and the heated nitrogen gas through a tortuous path toward the vehicle occupant restraint so as to remove particulates from the gases.

22 Claims, 3 Drawing Sheets

VEHICLE OCCUPANT RESTRAINT SYSTEM

BACKGROUND OF THE INVENTION

1. Technical Field

The present invention relates to an apparatus for supplying gas to inflate a vehicle occupant restraint, such as an airbag, and particularly to an apparatus for supplying generated gas along with stored gas. Description of the Prior Art Typically, an inflatable vehicle occupant restraint is inflated solely by gas which is generated by ignition of gas generating material. The gas generating material is generally volatile and must be handled carefully. Some have suggested that inflatable restraints be inflated by gas which is stored under pressure and by gas which is generated through ignition of gas generating material. In this way, the amount of gas generating material used can be reduced U.S. Pat. No. 3,723,205 discloses an apparatus for supplying gas to inflate a vehicle occupant restraint. The apparatus comprises gas generating material in combination with stored pressurized gas. The stored gas can be nitrogen, air, carbon-dioxide or helium. The gas generating material, when ignited, generates a hot gas. The gas generating material comprises a halogen free alkali metal salt, an inorganic oxidizer, and a polyvinyl chloride binder. Suitable inorganic oxidizers include alkali metal chlorates and perchlorates, such as ammonium perchlorate, and alkaline earth metal nitrates. Examples of halogen-free alkali metal salts are alkali metal oxalates, carbonates, bicarbonates, and azides, e.g., $KN_3$, The generated gas ruptures a seal and is directed into the pressurized stored gas. This increases the temperature and thus the pressure of the stored gas causing the commingled stored gas and generated gas to rupture a second seal. The commingled gas then flows into an inflatable device.

In U.S. Pat. No. 3,723,205 the ignition of the gas generating material creates relatively small particles which flow with the gas directly into the inflatable device. Removing these relatively small particles apparently was considered unnecessary because the patent does not disclose a technique for removal of these particles.

SUMMARY OF THE INVENTION

The present invention relates to a source of gas for inflating a vehicle occupant restraint such as an airbag. The source of gas comprises a container in which gas generating material is located. The gas generating material comprises an alkali metal azide and a metal oxide. The container also contains a supply of pressurized nitrogen gas which is separated from the gas generating material. The gas generating material when ignited produces heated nitrogen gas. An ignitor ignites the gas generating material to create the heated nitrogen gas. In the event of an emergency situation, such as a vehicle collision, the gas generating material is ignited by the ignitor to produce the heated nitrogen gas. The heated nitrogen gas commingles with the stored nitrogen gas, and commingled gases then flow toward the inflatable vehicle occupant restraint. The flow is constrained to follow a tortuous path whereby the residue produced by combustion of the gas generating material is separated from the commingled gases as the gases flow toward the inflatable vehicle occupant restraint.

Preferably, the tortuous path is defined such that molten metal and other particles in the residue deposit on the walls defining the path. Also, particles of non-molten residue become trapped and do not flow into the inflatable vehicle occupant restraint. The tortuous path is defined in part by openings in the container which direct the gas transversely of the longitudinal axis of the container and into a diffuser. The diffuser directs the gas parallel to the longitudinal axis of the container and has openings which direct the gas again transversely of the longitudinal axis of the container and toward the airbag.

The tortuous path is also defined in part by the container. The container includes an inner housing containing the gas generating material and an outer housing containing the stored gas. The gas generated by ignition of the gas generating material is directed through an exit passage from the inner container in one direction parallel to the longitudinal axis of the container. The gas then flows in another direction opposite the one direction parallel to the longitudinal axis of the container. The gas then flows through the openings in tne container which direct the gas transversely of the longitudinal axis of the container.

Further, during the flow of gas toward the inflatable vehicle occupant restraint, the gas is directed into a helical flow path. Preferably, this occurs when the gas is flowing in a direction parallel to the longitudinal axis of the container and prior to the gas flowing into the diffuser. Gas directing blades are each formed in a helical shape to create the helical flow. The blades are positioned in the gas flow in an axially spaced relation and extend at an angle to the gas flow and thus create the helical flow. The creation of the helical flow results in turbulence and deposit of residue on the blades and on the walls of the container adjacent the blades.

In addition, the container includes a pair of burst disks. One burst disk controls the flow of the gas generated by ignition of the gas generating material. The other burst disk controls the flow of gas from the container toward the inflatable vehicle occupant restraint. The disk which controls the flow of gas from the container toward the inflatable vehicle occupant restraint is heated to weaken the disk and thereby allow the pressure of the stored gas to break the disk. Each of the burst disks is a bulged prescored disk which has areas that pivot open to allow the gas to flow past the disk.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

The present invention is directed to an apparatus for providing gas to inflate an inflatable vehicle occupant restraint such as an airbag. The apparatus may take a variety of forms and may vary in detailed structure. As illustrative of the present invention, the drawings illustrate a preferred embodiment which includes a container 14 for providing gas to inflate an airbag.

Figure 1:
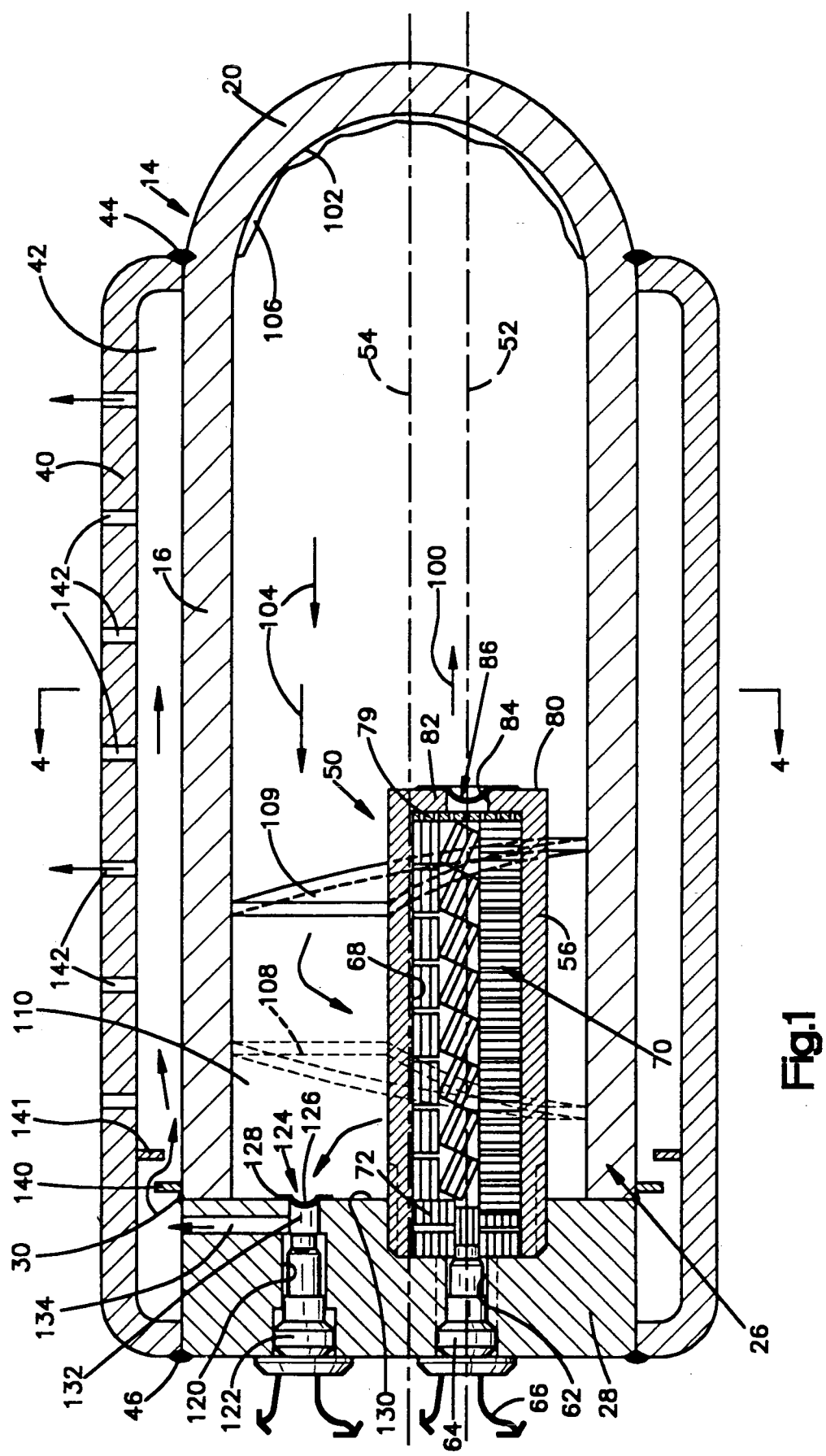
FIG. 1 is a longitudinal sectional view of an apparatus for supplying gas to inflate a vehicle occupant restraint in accordance with the present invention.

Referring to FIG. 1, the container 14 comprises an elongated cylindrical outer housing 16. The outer housing 16 contains stored nitrogen gas under pressure. The stored nitrogen gas housing 16 comprises a thin wall housing closed at one end 20. At its opposite end 26, the outer housing 16 is closed off by an end cap 28. End cap 28 has a diameter corresponding with end 26 of the outer housing 16. The end cap 28 is seated on the end 26 of the outer housing 16 and is welded to the end 26 by a circular weld 30. Weld 30 seals the end cap 28 to outer housing 16. The outer housing 16 is capable of retaining nitrogen gas at high pressures in the range of 3,000 to 3,500 psi.

The container 14 also comprises an outer cylindrical diffuser 40 which surrounds the stored nitrogen gas outer housing 16. The diffuser 40 is spaced from the outer housing 16 so that it defines with the outer housing 16 a diffusion chamber 42. The diffuser 40 is substantially coextensive with the stored nitrogen gas housing 16 and is welded at one end to the outer housing 16 and at its other end to end cap 28 by circular welds 44, 46.

The container 14 also comprises a gas generator 50, which is positioned within the outer housing 16. The gas generator 50 extends longitudinally within the outer housing 16, but its center line 52 is offset slightly to one side of the center line 54 of the housing 16. The gas generator 50 comprises a tubular inner housing 56. The tubular inner housing 56 may be formed in one piece with end cap 28 or welded to end cap 28 as illustrated. The inner housing 56 has a chamber 68 filled with gas generating material 70. The chamber 68 communicates with a passage 62 which is formed in the end cap 28 and which contains a squib 64, or other ignition device. The squib 64 is sealed in the passage 62. The squib is ignitable, for instance, by electric current in a known manner, the current being conveyed to the squib wires 66. Ignition of the squib 64 ignites the gas generating material 70 in chamber 68. The squib 64 is an ignition-type squib which is well known. A typical squib which could be used is marketed by Special Devices, Inc. under Model designation 89295.

The gas generating material 70 comprises shaped grains pressed from a mixture of an alkali metal azide compound and a metal oxide. The metal of the metal oxide is lower in the electromotive series than the alkali metal, so that the alkali metal will completely react with the metal oxide, replacing the metal in the metal oxide. The stoichiometry of the gas generating composition is such that all of the alkali metal will react with the metal oxide and no unreacted free alkali metal remains.

Examples of suitable alkali metals are sodium, potassium and lithium. Examples of suitable metal oxides are iron oxide ($Fe_2O_3$ or $Fe_3O_4$), copper oxide (CuO), aluminum oxide, and silicon dioxide ($SiO_2$).

The gas generating material 70 preferably contains a predetermined amount of fibers, such as graphite fibers, to reinforce the grains mechanically and avoid cracks in the grains. Cracks in a grain produce unwanted grain surface area that can accelerate grain burn rate in an unpredictable manner. The graphite fibers also function to promote burning of the grains and assist in forming a larger, stronger sinter. The use of fibers assists in producing a relatively coarse residue which consists substantially of materials which are non-volatile under the reaction conditions. Fibers other than graphite, such as glass and steel wool, can be used. The graphite fibers can, by way of example, be 3-6 microns in diameter and 40-80 thousandths of an inch in length.

The gas generating material 70 preferably also contains an extrusion aid such as bentonite, a binder such as sodium nitrate, and a sintering aid such as fumed silicon dioxide. One suitable silicon dioxide is sold under the trademark CAB-O-SIL by Cabot Manufacturing Company with the product designation EH5.

A preferred gas generating composition comprises:

| Component | Preferred Range | Example |
| --- | --- | --- |
| Sodium Azide | 61–68% | 63% |
| Iron Oxide | 23–28% | 26.5% |
| Graphite Fibers | 2–5% | 4% |
| Bentonite | 0–5% | 2% |
| Fumed Silicon Dioxide | 1–2% | 2% |
| Sodium Nitrate | 0–5% | 2.5% |

The iron oxide is doped with about 1% nickle oxide.

The shape of the grains of gas generating material 70 is not critical. A preferred shape comprises "macaroni" shaped pieces, as shown. Each such piece is about a quarter to one-half inch in length, e.g. 0.4 inch, about 0.25 inch in diameter, and has a central longitudinal opening of about 0.09 inch in diameter. To produce the macaroni shaped pieces of the gas generating material, a slurry is formed of the gas generating ingredients, and the slurry is extruded through a die to the desired shape. The extruded material is then cut to desired lengths and the extruded pieces are dried. The gas generating material can have other configurations, for instance a pill-shape In the embodiment of the present invention illustrated in the Figures, the gas generating material 70 is randomly disposed within the chamber 68. By way of example, forty to fifty grams of gas generating material 70 may be used.

Preferably, the inner housing 26 also contains a booster material 72. The booster material 72 is an ignition enhancing material which is ignitable by squib 64 and produces a high temperature flame that enhances the ignition of the gas generating material 70. The booster material 72 preferably comprises a metal fuel such as magnesium, boron, or chromium, and an oxidant such as an alkali or alkaline earth metal nitrate, chlorate, chromate, or perchromate Another known oxidant is a halogen containing hydrocarbon homopolymer or copolymer, such as TEFLON and VITON (Trademarks E.I. Dupont de Nemours & Co.). One suitable booster material is boron potassium nitrate ($BKNO_3$). This booster material ignites with a high caloric output of about 1100–1650 calories per gram. Another suitable booster material comprises a granular mixture of 25% by weight of boron and 75% potassium nitrate, with or without 10% lead azide. This mixture burns with a very high flame suitable for igniting gas generant material and is disclosed in U.S. Pat. No. 4,561,675. The booster material 72 is shown in the drawings as discrete pills positioned adjacent to the squib 64 and interposed between the gas generating material 70 and the squib 64. Alternatively, the booster material can be mixed into the formulation of the gas generating material, or applied as a coating to the gas generating material, or dispersed as discrete grains throughout the chamber 68. Preferably the booster material is present in the chamber 68 in an amount up to about 30%, for instance about 10%, of the weight of the material in the chamber 68.

Figure 2:
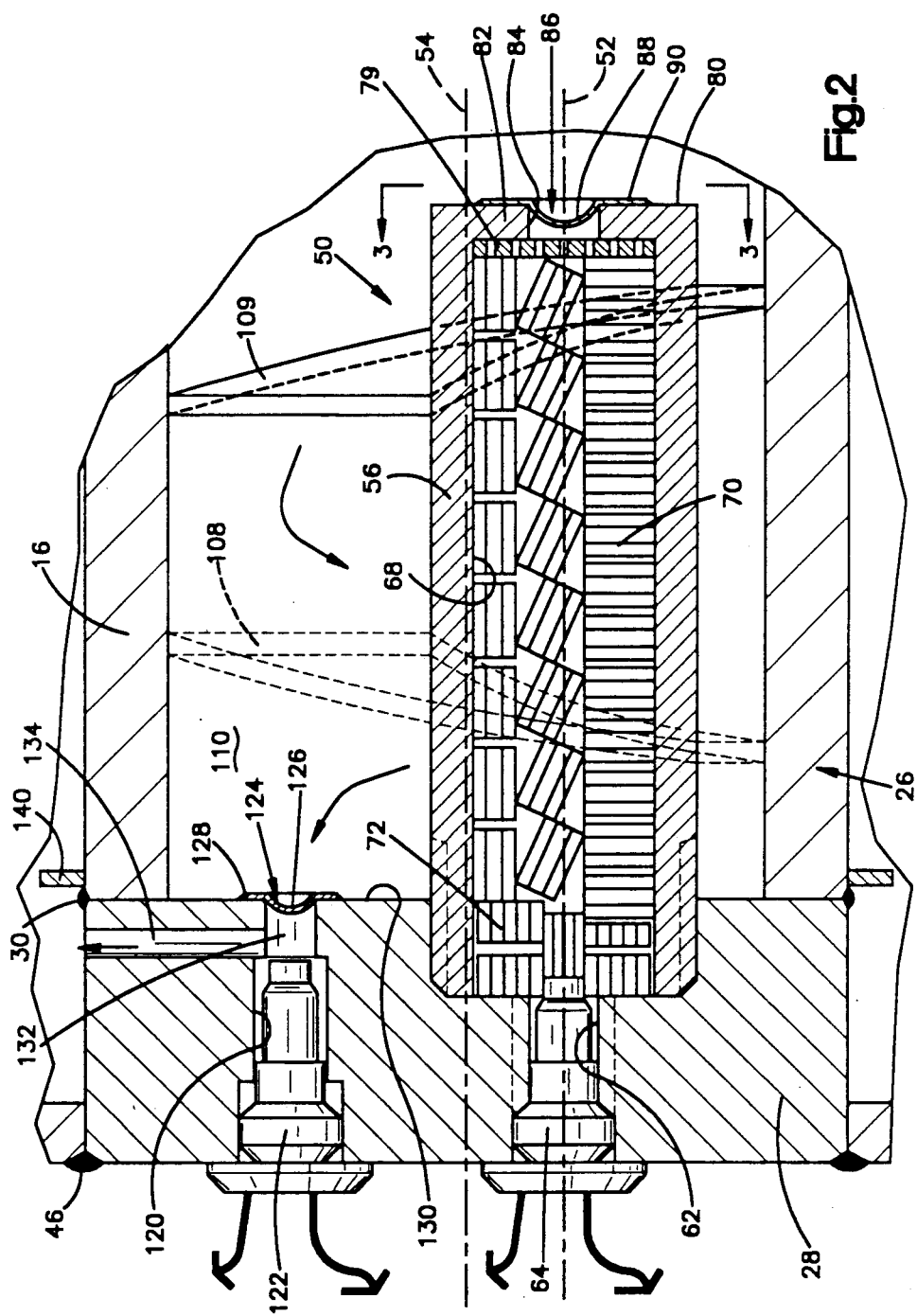
FIG. 2 is an enlarged sectional view of a portion of the apparatus of FIG. 1.

Referring to FIG. 2, the gas generator inner housing 56 has at its end 80 away from the squib 64 an inwardly projecting rim 82 defining a narrowed opening 84. A particle filter 79 is located in the chamber 68 adjacent opening 84. The filter 79 is a metal disk, preferably a steel disk, having a plurality of openings therein of a suitable size, such as 0.090 inches. The disk functions to trap large particles in the generated gas in the chamber 68.

The rim 82 of the inner housing 56 functions in part to retain the gas generating material 70 within the chamber 68, and in part as a seat for a burst disk 86 which closes opening 84. The burst disk 86 (FIG. 3) comprises a bulged (domed) center portion 88, which extends toward chamber 68, and a peripheral flange 90. The burst disk 86 is preferably welded to the inner housing 56.

Figure 3:
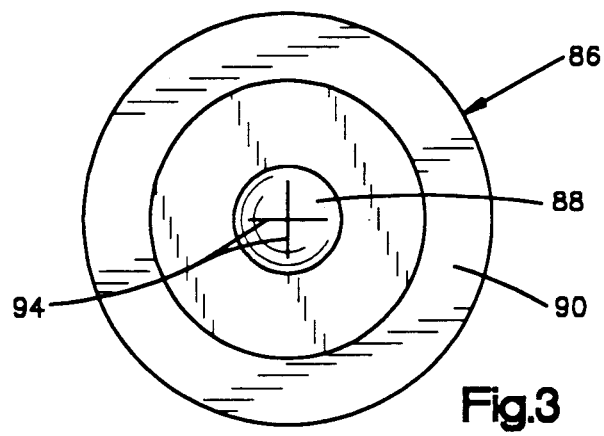
FIG. 3 is a view taken approximately along line 3—3 of FIG. 2.

The bulged burst disk 86 can be comprised of a number of different materials. One suitable material is stainless steel. The bulged burst disk 86 is preferably scored with crossed score lines 94 in the center portion 88, as shown in FIG. 3. The score lines define areas of the bulged burst disk which are petal shaped and which pivot or move outwardly relative to chamber 68 when the bulged burst disk bursts.

In operation, the squib 64 fires the booster material 72 which, in turn, ignites the gas generating material 70. This generates a high pressure gas which ruptures the burst disk 86 allowing the generated gas to exit at high velocity from the chamber 68 through the filter 79 and passage 84. The gas jet exiting from passage 84 is directed at high velocity generally parallel to the longitudinal axis 54 of the outer housing 16 in the direction of arrow 100, FIG. 1. The gas jet flows towards the closed end 20 of the outer housing 16. The closed end 20 has a domed inner deflection surface 102. The domed surface 102 forces the gas jet to make a 180 degree turn and to flow back along the outer housing 16 towards the housing end 26, as shown by arrows 104 in FIG. 1. This flow is also generally parallel to the longitudinal axis 54 of the outer housing 16 but in a direction opposite the direction of arrow 100.

The gas jet exiting from passage 84 comprises primarily nitrogen gas and solid residue in the form of relatively large particulates and molten metal. Because of the 180 degree turn at the end 20 of the outer housing 16, at least some of the relatively large particulates are inertially removed from the nitrogen gas stream, and impinge and fuse against the domed surface 102. In a preferred embodiment of the present invention, the domed surface 102 is coated with a coating material 106, such as a high temperature silicone grease, which helps capture particles at surface 102 rather than allowing them to rebound into the nitrogen gas jet stream. An example of a suitable coating material is a valve and lubricant sealant marketed by Dow Corporation under the trade designation "Dow Sealant 111".

Figure 4:
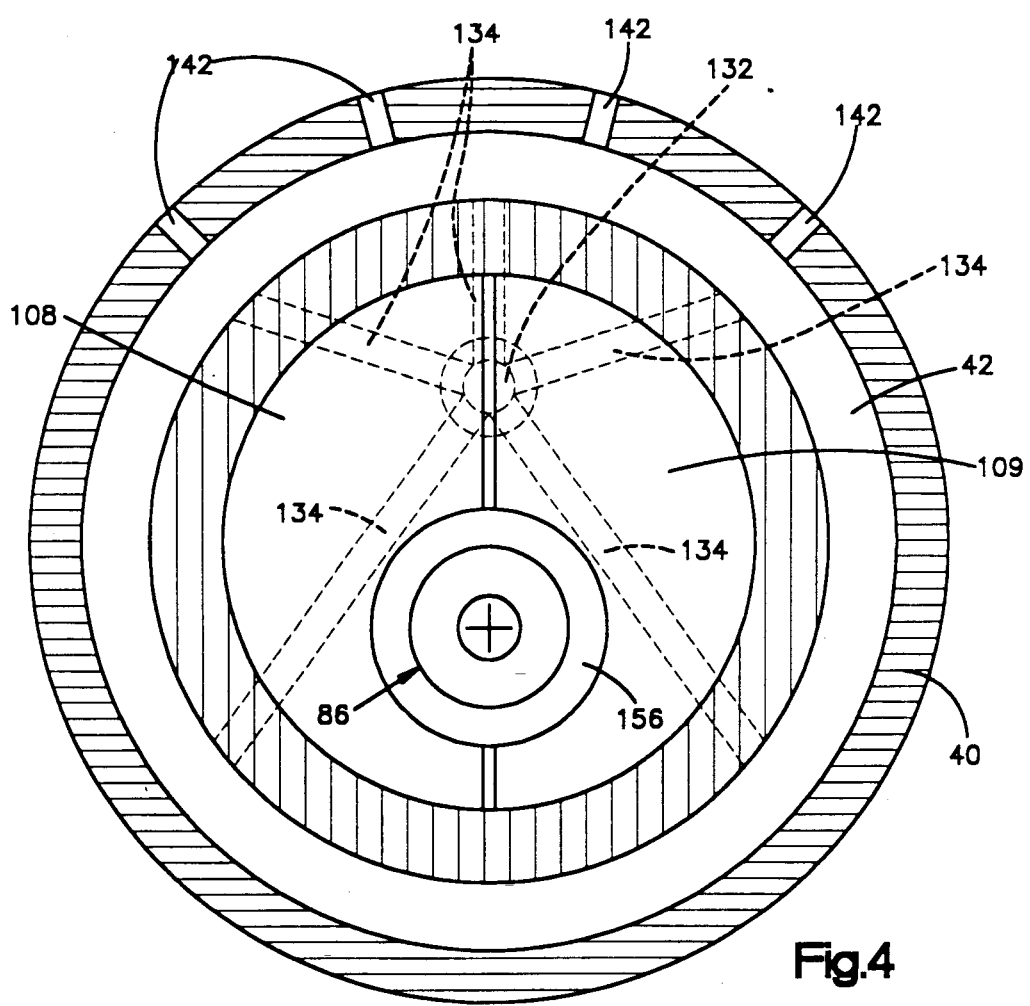
FIG. 4 is a sectional view taken approximately along line 4—4 of FIG. 1.

Gas flowing in the path illustrated by arrows 104 impinges against a pair of helical blades 108, 109 (see FIG. 4) which are interposed in the annular space 110 between the inner housing 56 and outer housing 16. The blades 108, 109 are spaced axially from each other along the housing 16, and each extends about 180° about the inner housing member 56. The axial spacing is illustrated in FIGS. 1 and 2, with blade 108 being shown in phantom lines. The blades are also circumferentially spaced about 180° relative to each other. Thus, about one half of the gas flow engages each blade and is directed into a helical path through which the gas swirls about the inner housing member 56. This causes the stream of gas to adopt a helical path which results in further inertial separation of residual products of combustion from the nitrogen gas stream and fusion of molten products on the surfaces of the blades 108, 109 and housings 16, 56.

The end cap 28 has a passage 120 which is offset to one side of the center of the end cap 28 and is in communication with the annular space 110. The passage 120 contains a squib 122 which is threaded into and sealed in the passage 120. The passage 120 is covered with a burst disk 124 which is similar to the burst disk 86. The burst disk 124 has a center bulged domed portion 126, which extends into the passage 120, and a peripheral flange portion 128, which is welded to a surface 130 of the end cap 28. The burst disk 124 blocks fluid communication between annular space 110 and passage 120.

The passage 120 has a chamber portion 132 interposed between the bulged burst disk 124 and the squib 122. The chamber portion 132 communicates with passages 134 which extend laterally through the end cap 28 and transversely of the axis 54 of the outer housing 16. The passages 134 open to the diffusion chamber 42. The gas exiting into the diffusion chamber 42 from the radial passages 134 is guided in a direction generally parallel to the axis 54 of the outer housing 16. The gas then encounters a pair of radially extending baffles 140, 141 around which the gas must flow. The baffles 140, 141 trap further particles in the gas. The diffuser 40 has radially extending openings 142 which are located downstream of the baffles 140, 141 and which direct gas from the diffusion chamber 42 to a vehicle restraint such as an airbag.

In operation, the squib 122, when fired, produces a high temperature which heats the burst disk 124 to a high temperature. One suitable type of squib is marketed by Dynamit Nobel under the trade designation "AZEL 7, Mod. 3". This reduces the tensile strength of the burst disk 124 and causes the burst disk 124 to rupture due to the pressure within the outer housing 16. On rupture of the burst disk 124, the gas within housing 16 exits through passage 120 into chamber portion 132 and flows through radial passages 134 into the diffusion chamber 42. The gas exits from the diffusion chamber through openings 142.

By the present invention, the amount of gas generating material required can be substantially reduced compared with the amount required in conventional gas generating apparatus. For instance, the apparatus of the present invention may require 1/10th of the gas generating material conventionally required. In addition, the present invention enables substantial flexibility in the inflation of the airbag. For instance, relative amounts of booster material, gas generating material and stored nitrogen gas can be varied. Also, the sequence of firing the squibs 64 and 122 can be varied. For instance, squib 122 can be fired before squib 64 to release stored nitrogen gas to the airbag first, or can be fired after squib 64 to release the commingled gases. The present invention also provides for effective removal of particulate from the nitrogen gas. This is facilitated by the composition of the gas generating material 70 which is such as to produce a particulate having a relatively large particle size. Further the multiple changes of direction for the gas stream as it flows from the inner housing 56 and from the outer housing 16 to the airbag provide a tortuous path which inertially separates particulates from the gas stream. Thus, a minimum amount of particulates are directed into the airbag.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. A source of gas for inflating a vehicle occupant restraint, said source comprising:
   means defining a container;
   gas generating material in said container, said gas generating material comprising an alkali metal azide and an oxidizer, said gas generating material when ignited producing heated nitrogen gas;
   a stored supply of pressurized nitrogen gas in said container;
   ignitor means for igniting said gas generating material to create a heated nitrogen gas;
   means for separating said stored nitrogen gas from said gas generating material, said means for separating being releasable to enable said heated nitrogen gas and said stored nitrogen gas to commingle; and
   means for directing said stored nitrogen gas and said heated nitrogen gas through a tortuous path toward the vehicle occupant restraint.

2. The source of gas for inflating a vehicle occupant restraint as defined in claim 1 wherein said alkali metal azide is sodium azide and said oxidizer is iron oxide.

3. The source of gas for inflating a vehicle occupant restraint as defined in claim 1 wherein said container includes an outer housing containing said stored nitrogen gas, and said means for separating said stored nitrogen gas and said gas generating material includes an inner housing containing said gas generating material, said inner housing having a burst disk which bursts to release the heated nitrogen gas generated by said gas generating material.

4. The source of gas for inflating a vehicle occupant restraint as defined in claim 1 wherein said container has a longitudinal axis and at one end said container has a plurality of openings through which said heated nitrogen gas and said stored nitrogen gas exit from said container in a direction transverse to the longitudinal axis of said container; and
   said source further including a diffuser for receiving said heated nitrogen gas and said stored nitrogen gas from said plurality of openings and for directing said heated nitrogen gas and said stored nitrogen gas in a path parallel to the axis of said container, said diffuser having openings for directing said stored nitrogen gas and said heated nitrogen gas inn a direction transverse to the longitudinal axis of said container;
   said openings in said container, said openings in said diffuser and said diffuser defining said tortuous path.

5. The source of gas for inflating a vehicle occupant restraint as defined inn claim 4 wherein said means for separating said stored nitrogen gas from said gas generating material includes an inner housing containing said gas generating material, said inner housing having an exit passage for directing said heated nitrogen gas in one direction parallel to the longitudinal axis of said container,
   said container including an outer housing for stored nitrogen gas, said outer housing having an end wall against which particles in said heated nitrogen gas impinge, said outer housing also having longitudinally extending surfaces for directing said heated nitrogen gas and the stored nitrogen gas in another direction parallel to said longitudinal axis of said container opposite said one direction,
   said end wall of said outer housing and said surface of said outer container further defining said tortuous path.

6. A source of gas for inflating a vehicle occupant restraint as defined inn claim 5 and further including a helically shaped blade in said container for directing said heated nitrogen gas and said stored nitrogen gas in a helical path as said heated nitrogen gas and said stored nitrogen gas are directed in said another direction.

7. A source of gas for inflating a vehicle occupant restraint as defined in claim 1 wherein said container includes at least one burst disk which bursts at a predetermined pressure to release gas for flow past the burst disk, said burst disk comprising a bulged scored disk which has areas that pivot open at said predetermined pressure.

8. A source of gas for inflating a vehicle occupant restraint as defined in claim 1 and further including means in said tortuous path for directing said stored nitrogen gas and said heated nitrogen gas in a helical flow path.

9. A source of gas for inflating a vehicle occupant restraint, said source comprising:
   means defining a container;
   gas generating material in said container, said gas generating material comprising an alkali metal azide and a metal oxidizer, said gas generating material when ignited producing heated nitrogen gas;
   a stored supply of pressurized nitrogen gas in said container;
   ignitor means for igniting said gas generating material to create a heated nitrogen gas;
   means for separating said stored nitrogen gas from said gas generating material, said means for separating being releasable to enable said heated nitrogen gas to commingle with said stored nitrogen gas;
   means for directing said stored nitrogen gas and said heated nitrogen gas toward the occupant restraint, and
   means for directing said stored nitrogen gas and said heated nitrogen gas inn a helical path as said stored nitrogen gas and said heated nitrogen gas are directed toward the occupant restraint.

10. A source of gas for inflating a vehicle occupant restraint as defined in claim 9 wherein said means for directing said stored nitrogen gas and the heated nitrogen gas in a helical path includes at least one helical blade in said container which directs said heated nitrogen gas and said stored nitrogen gas in a helical path.

.11. A source of gas for inflating a vehicle occupant restraint as defined inn claim 10 wherein said container has a longitudinal axis and at one end said container has a plurality of openings through which said heated nitrogen gas and said stored nitrogen gas exit from said container in a direction transverse to the longitudinal axis of said container; and said source further including a diffuser for receiving said heated nitrogen gas and said stored nitrogen gas from said plurality of openings and for directing said heated nitrogen gas and said stored nitrogen gas in a path parallel to the axis of said container, said diffuser having openings for directing said stored nitrogen gas and said heated nitrogen gas i a direction transverse to the longitudinal axis of said container.

12. The source of gas for inflating a vehicle occupant restraint as defined in claim 11 wherein said means for separating said stored nitrogen gas from said gas generating material comprises an inner housing containing said gas generating material, said inner housing having an exit passage for directing said heated nitrogen gas in one direction parallel to the longitudinal axis of said container, said container including an outer housing for said stored nitrogen gas, said outer housing having an end wall against which particles in said heated nitrogen gas impinge, said outer housing also having surfaces for directing said heated nitrogen gas and the stored nitrogen gas in another direction parallel to said longitudinal axis of said container opposite said one direction;

said at least one helical blade acting on said heated nitrogen gas and said stored nitrogen gas as said heated nitrogen gas and said stored nitrogen gas flow in said another direction.

13. A source of gas for inflating a vehicle occupant restraint as defined in claim 12, said source further comprising another helical blade spaced from said one helical blade, each of said helical blades extending approximately 180° around the longitudinal axis of the container and each being circumferentially offset from the other.

14. A source of gas for inflating a vehicle occupant restraint, said source comprising:
means defining a container;
gas generating material in said container, said gas generating material when ignited producing heated nitrogen gas;
a stored supply of pressurized nitrogen gas in said container;
ignitor means for igniting said gas generating material to create a heated nitrogen gas;
means for separating said stored nitrogen gas from said gas generating material, said means for separating being releasable to cause said heated nitrogen gas to commingle with sad stored nitrogen gas;
a first burst disk which bursts at a first predetermined pressure to release gas for flow from said container; and
means for heating said first burst disk to weaken said first burst disk so that it bursts due to the pressure of the said stored nitrogen gas.

15. A source of gas for inflating a vehicle occupant restraint, said source comprising:
means defining a container having a longitudinal axis;
gas generating material in said container, said gas generating material comprising an alkali metal azide and an oxidizer, said gas generating material when ignited producing heated nitrogen gas;
a stored supply of pressurized nitrogen gas in said container;
ignitor means for igniting said gas generating material to create a heated nitrogen gas;
means for separating said stored nitrogen gas from said gas generating material, said means for separating being releasable to enable said heated nitrogen gas and said stored nitrogen gas to commingle, said means for separating said stored nitrogen gas from said gas generating material including an inner housing containing said gas generating material, said inner housing having an exit passage for directing said heated nitrogen gas in one direction parallel to the longitudinal axis of said container;
said container including an outer housing for said stored nitrogen gas, said outer housing having an end wall against which particles inn said heated nitrogen gas impinge, said end wall having a coating of a material against which the particles stick, said outer housing also having longitudinally extending surfaces for directing said heated nitrogen gas and said stored nitrogen gas in another direction parallel to said longitudinal axis of aid container opposite said one direction, one end of said container having a plurality of openings through which said heated nitrogen gas and said stored nitrogen gas exit from said container in a direction transverse to the longitudinal axis of said container;
a diffuser for receiving said heated nitrogen gas and said stored nitrogen gas from said plurality of openings and for directing said heated nitrogen gas and said stored nitrogen gas in a path parallel to the axis of said container, said diffuser having openings for directing said stored nitrogen gas and said heated nitrogen gas in a direction transverse to the longitudinal axis of said container; and
means for directing said stored nitrogen gas and said heated nitrogen gas through a tortuous path toward the vehicle occupant restraint, said tortuous path being defined by said end wall of aid outer housing, said surfaces of said outer container, said openings in said container, said openings in said diffuser and said diffuser.

16. A source of gas for inflating a vehicle occupant restraint, said source comprising:
means defining a container;
gas generating material in said container, said gas generating material comprising an alkali metal azide and an oxidizer, said gas generating material when ignited producing heated nitrogen gas;
a stored supply of pressurized nitrogen gas in said container;
ignitor means for igniting said gas generating material to create a heated nitrogen gas;
means for separating said stored nitrogen gas from said gas generating material, said means for separating being releasable to enable said heated nitrogen gas and said stored nitrogen gas to commingle; and
means for directing said stored nitrogen gas and said heated nitrogen gas through a tortuous path toward the vehicle occupant restraint;
said container including at least two burst disks which burst at respective predetermined pressures to release gas for flow past the burst disks;
a first one of said burst disks comprising said means for separating said stored nitrogen gas and said gas generating material and opening to enable flow of said heated nitrogen gas into said stored nitrogen gas;

a second one of said burst disks controlling flow of gas from said container, and means for heating said second burst disk to weaken said second burst disk so that it bursts due to said stored nitrogen gas pressure.

17. A source of gas for inflating a vehicle occupant restraint as defined in claim 16 wherein said second burst disk bursts when said gas generating material creates a predetermined pressure acting on said second disk.

18. A source of gas for inflating a vehicle occupant restraint as defined in claim 17 wherein each of said first and said second burst disks comprise a bulged disk having score lines defining areas which pivot open to allow gas to flow past said disks.

19. A source of gas for inflating a vehicle occupant restraint, said source comprising:

means defining a container;

gas generating material in said container, said gas generating material when ignited producing heated nitrogen gas;

a stored supply of pressurized nitrogen gas in said container;

ignitor means for igniting said gas generating material to create a heated nitrogen gas;

means for separating said stored nitrogen gas from said gas generating material, said means for separating being releasable to cause said heated nitrogen gas to commingle with said stored nitrogen gas;

a first burst disk which bursts at a first predetermined pressure to release gas for flow from said container; and means for heating said first burst disk to weaken said first burst disk so that it bursts due to the pressure of said stored nitrogen gas;

said separating means comprising a second burst disk for controlling flow of said heated nitrogen gas into the stored nitrogen gas, said second burst disk bursting when said gas generating material creates a predetermined pressure acting on said second disk.

20. A source of gas as defined in claim 19 wherein each of said first and said second burst disks include a bulged disk having score liens which define areas which pivot open to allow gas to flow past said disks.

21. A source of gas as defined in claim 20 wherein said container has a longitudinal axis and at one end said container has a plurality of openings through which said heated nitrogen gas and said stored nitrogen gas exit from said container in a direction transverse to the longitudinal axis of said container; and said source further including a diffuser for receiving said heated nitrogen gas and said stored nitrogen gas from said plurality of openings and for directing said heated nitrogen gas and said stored nitrogen gas in a path parallel to the axis of aid container, said diffuser having openings for directing said stored nitrogen gas and said heated nitrogen gas in a direction transverse to the longitudinal axis of said container.

22. A source of gas for inflating a vehicle occupant restraint, said source comprising:

means defining a container having a longitudinal axis;

gas generating material in said container, said gas generating material when ignited producing heated nitrogen gas;

a stored supply of pressurized nitrogen gas in said container;

ignitor means for igniting said gas generating material to create a heated nitrogen gas; and means for separating said stored nitrogen gas from said gas generating material, said means for separating being releasable to enable said heated nitrogen gas and said stored nitrogen gas to commingle, said means for separating said stored nitrogen gas from said gas generating material including an inner housing containing said gas generating material, said inner housing having an exit passage for directing said heated nitrogen gas in one direction parallel to the longitudinal axis of said container;

said container including an outer housing for said stored nitrogen gas, said outer housing having an end wall disposed at one end for deflecting said heated nitrogen gas from the one direction;

said outer housing also having longitudinally extending surfaces for directing said heated nitrogen gas and said stored nitrogen gas in another direction parallel to said longitudinal axis of said container opposite said one direction;

said end wall and said longitudinally extending surfaces partially defining a tortuous path.

* * * * *

UNITED STATES PATENT AND TRADEMARK OFFICE
CERTIFICATE OF CORRECTION

PATENT NO. : 5,016,914

DATED : May 21, 1991

INVENTOR(S) : Ernst M. Faigle, et al.

Page 1 of 2

It is certified that error appears in the above-identified patent and that said Letters Patent is hereby corrected as shown below:

Column 7, Lines 59 and 65, Claims 4 and 5, change "inn" to --in--.

Column 8, Lines 16 and 65, Claims 6 and 11, change "inn" to --in--.

Column 9, Line 10, Claim 11, change "i" to --in--.

Column 10, Line 15, Claim 15, change "inn" to --in--.

Line 21, Claim 15, delete "aid" and insert --said--.

Line 38, Claim 15, delete "aid" and insert --said--.

Column 11, Line 46, Claim 20, delete "liens" and insert --lines--.

UNITED STATES PATENT AND TRADEMARK OFFICE
CERTIFICATE OF CORRECTION

PATENT NO. : 5,016,914

DATED : May 21, 1991

INVENTOR(S) : Ernst M. Faigle, et al.

It is certified that error appears in the above-identified patent and that said Letters Patent is hereby corrected as shown below:

Column 11, line 46, Claim 20, delete "liens" and insert --lines--.

Signed and Sealed this

Second Day of February, 1993

*Attest:*

STEPHEN G. KUNIN

*Attesting Officer*     Acting Commissioner of Patents and Trademarks